United States Patent
Shafer

(10) Patent No.: US 8,078,102 B2
(45) Date of Patent: Dec. 13, 2011

(54) CABLE SYSTEM WITH ACTIVE RF DEVICE POWERED BY RF ENERGY CONVERTED TO DC POWER, AND ASSOCIATED METHOD

(75) Inventor: Steve Shafer, Chittenango, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 982 days.

(21) Appl. No.: 11/743,291

(22) Filed: May 2, 2007

(65) Prior Publication Data

US 2008/0274691 A1 Nov. 6, 2008

(51) Int. Cl.
H04B 7/14 (2006.01)
H04B 7/00 (2006.01)
H04W 24/00 (2009.01)

(52) U.S. Cl. ............ 455/14; 455/423; 455/524

(58) Field of Classification Search .......... 455/14, 455/214, 184.1, 185.1, 423, 524, 525, 561
See application file for complete search history.

(56) References Cited

U.S. PATENT DOCUMENTS

| | | | |
|---|---|---|---|
| 4,271,462 A | 6/1981 | Peters | |
| 4,985,912 A * | 1/1991 | Ono | 455/566 |
| 5,812,184 A * | 9/1998 | Martinez | 725/131 |
| 5,832,364 A * | 11/1998 | Gustafson | 455/14 |
| 5,907,264 A | 5/1999 | Feldman | |
| 5,929,718 A | 7/1999 | Crosby | |
| 6,127,799 A | 10/2000 | Krishnan | |
| 7,123,606 B2 * | 10/2006 | Wu et al. | 370/352 |
| 7,379,717 B1 * | 5/2008 | Haab et al. | 455/127.1 |
| 7,436,819 B2 * | 10/2008 | Ezumi | 370/352 |
| 2002/0128006 A1 * | 9/2002 | Martine et al. | 455/423 |
| 2002/0160713 A1 | 10/2002 | Flaxl | |
| 2003/0137400 A1 | 7/2003 | Heinrich et al. | |
| 2005/0027175 A1 | 2/2005 | Yang | |
| 2005/0075090 A1 * | 4/2005 | Bickham et al. | 455/344 |

* cited by examiner

Primary Examiner — Tilahun B Gesesse
(74) Attorney, Agent, or Firm — Schmeiser, Olsen & Watts, LLP

(57) ABSTRACT

A cable system comprises a main line carrying first RF signals for a plurality of subscribers, and a subscriber line coupled with the main line and carrying the first RF signals between the subscriber's facility and the main line and also carrying second RF signals that are different in frequency from the first RF signals. The system further comprises a rectifier/voltage multiplier connected to the subscriber line for converting AC energy in the second RF signals into DC current, and an active RF device powered by the DC current from the rectifier/voltage multiplier, the RF device being located along the subscriber line. The system can include a filter connected between the subscriber line and the rectifier/voltage multiplier for filtering the second RF signals. The rectifier/voltage multiplier can be located either inside or outside the subscriber's facility.

18 Claims, 4 Drawing Sheets

CABLE SYSTEM WITH ACTIVE RF DEVICE POWERED BY RF ENERGY CONVERTED TO DC POWER, AND ASSOCIATED METHOD

BACKGROUND OF THE INVENTION

This invention relates to wired networks for transmission of video and/or voice and/or data.

Cable television (CATV) systems generally comprise a head-end facility from which a plurality of trunk lines or main distribution lines emanate in a hub-and-spoke arrangement. Each trunk line serves one or more local distribution networks each of which serves a relatively small number (e.g., about 100 to 250) of end users or subscribers. Each subscriber is connected with one of the trunk lines via a subscriber line that connects with the trunk line at a tap.

CATV systems typically employ 90-volt AC to power main line equipment such as amplifiers and equalizers that are used in the transmission of broadband RF signals from the head-end facility over the various trunk lines to the individual subscribers' facilities (referred to as "forward signals"). Some subscribers may also have equipment such as cable modems that transmit return RF signals back to the head-end facility, and the main line equipment is also used in the transmission of such return signals. The 90-volt AC is carried by each trunk line, but does not go into the subscriber's facilities. The subscriber lines going into the subscribers' facilities typically carry only RF forward and return signals. Thus, devices located along a "drop" between the trunk line tap and a subscriber's facility in current system architectures are limited to being passive devices.

It would be desirable to be able to employ various types of active devices along a drop in a cable system. However, current architectures generally do not allow such usage because of the lack of an available power source for powering active devices

BRIEF SUMMARY OF THE INVENTION

The present invention addresses the above needs and enables other advantages, by providing a cable system in which AC energy from RF signals is converted into DC current for powering an active RF device along a drop. In accordance with one embodiment of the invention, a cable system comprises a main line carrying first RF signals for a plurality of subscribers, and a subscriber line coupled with the main line and carrying the first RF signals between the subscriber's facility and the main line and also carrying second RF signals that are different in frequency from the first RF signals. The system further comprises a rectifier/voltage multiplier connected to the subscriber line for converting AC energy in the second RF signals into DC current, and an active RF device powered by the DC current from the rectifier/voltage multiplier, the RF device being located along the subscriber line. The system can include a filter connected between the subscriber line and the rectifier/voltage multiplier for selectively passing the second RF signals to the rectifier/voltage multiplier. The rectifier/voltage multiplier can be located either inside or outside the subscriber's facility.

The active device can comprise any of various types of devices, including but not limited to an amplifier, an active filter, an active step attenuator, etc. More than one active device can be located along a given drop.

In a particular embodiment of the invention, the main line comprises a trunk line carrying AC power and the first RF signals. The system further comprises an RF signal generator coupled with the trunk line and powered by the AC power to generate the second RF signals. A tap is connected to the trunk line and to the RF signal generator. The subscriber line is connected to the tap such that the second RF signals are carried over the subscriber line into the subscriber's facility.

In other embodiments, the second RF signals can originate inside the subscriber's facility. For example, the second RF signals can comprise return signals transmitted from the subscriber to the main line. The second RF signals for instance can be generated by a cable modem or converter box located inside the subscriber's facility. Alternatively, the second RF signals can comprise ingress noise picked up by the subscriber line from any of various RF equipment located in or near the subscriber's facility.

In still another embodiment, an antenna is provided proximate the subscriber's facility for receiving free-radiated RF signals. The rectifier/voltage multiplier is connected to the antenna. The RF signals received by the antenna are the second RF signals converted by the rectifier/voltage multiplier into DC current for powering the active device. The antenna can include a filter for selectively receiving signals in a particular frequency band (e.g., the frequency band used for WiFi signals transmitted by wireless Internet devices in or near the subscriber's facility).

In another aspect of the invention, a method is provided for communicating RF signals between a head-end facility and a subscriber's facility, comprising the steps of transmitting first RF signals between the head-end facility and the subscriber's facility via a main line and a subscriber line tapped into the main line, the subscriber line also carrying second RF signals different in frequency from the first RF signals; rectifying the second RF signals to produce a DC current; and using the DC current to power an active RF device located along the subscriber line.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
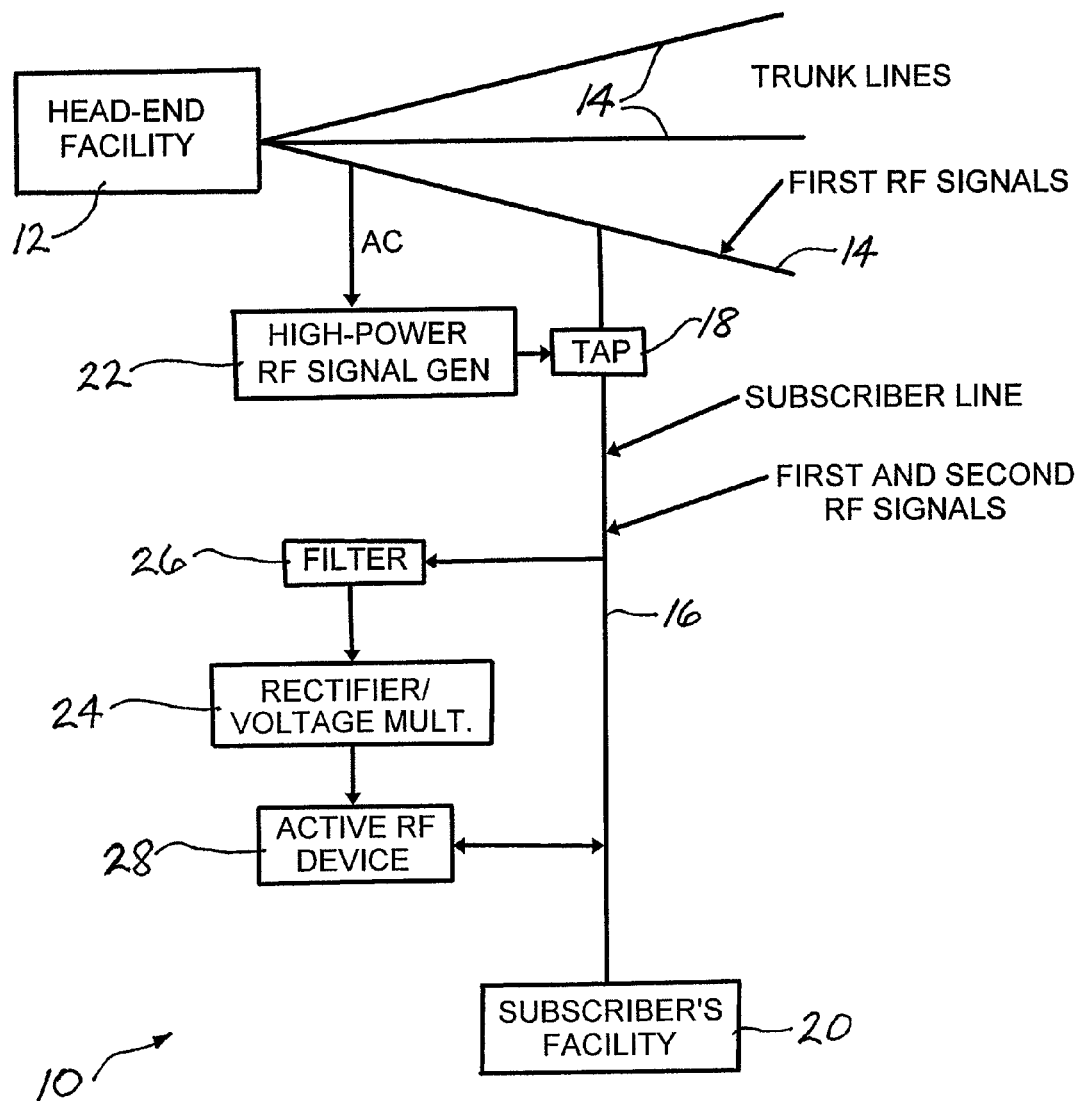
FIG. 1 is a diagrammatic view of a cable system in accordance with a first embodiment of the invention.

A cable system 10 in accordance with a first embodiment of the invention is depicted in FIG. 1. The system includes a head-end facility 12 at which programming and/or communication services for subscribers originate. The head-end facility sends the programming and/or communication services in the form of broadband RF signals over a plurality of main or trunk lines 14. Each trunk line serves one or more local distribution networks each of which serves a relatively small number (e.g., about 100 to 250) of end users or subscribers. Each subscriber is connected with one of the trunk lines 14 via a subscriber line 16 that connects with the trunk line at a tap 18. The subscriber line runs from the tap 18 to a subscriber's facility 20, such as a home or business. The subscriber line can connect with various types of devices in the subscriber's facility, such as a CATV converter box or "set-top" box, a cable modem, etc. The subscriber line 16 can be, for example, a coaxial cable having a center conductor carrying the RF signals.

Each trunk line 14 has multiple conductors, one or more of which carry the broadband RF signals (also referred to herein as "first RF signals"), while one or more other conductors carry AC current for powering various types of main line equipment (not shown) installed along the trunk line, such as amplifiers, equalizers, etc. The AC power typically is 90 volts AC, and is confined to the trunk lines—i.e., the 90 VAC power does not go into the subscriber's facility 20.

The system 10 includes a generator 22 for generating high-powered RF signals (also referred to herein as "second RF signals"). The generator 22 is powered by the AC power in the trunk line 14. The second RF signals generated by the generator occupy a frequency (or band of frequencies) different from the frequency (or band of frequencies) occupied by the first RF signals carrying the programming and/or communication services between the head-end facility and the subscriber. As an example, the first RF signals can comprise forward RF signals (from the head-end facility 12 to the subscriber's facility 20) in a frequency range of about 54 MHz to about 1 GHz. Additionally, the first RF signals can include return signals (from the subscriber's facility 20 to the head-end facility 12) in a frequency range of about 5 MHz to about 42 MHz. The second RF signals produced by the generator 22 occupy a range of frequencies outside these bands. The second RF signals are fed to the tap 18 for transmission along the subscriber line 16 toward the subscriber's facility.

The system 10 includes a rectifier/voltage multiplier 24 connected via a filter 26 to the subscriber line 16. The filter 26 is operable to process the various RF signals carried along the subscriber line such that substantially only the second RF signals produced by the generator 22 are passed to the rectifier/voltage multiplier 24. The rectifier/voltage multiplier 24 rectifies the second RF signals and multiplies the voltage to produce DC current that powers an active RF device 28 coupled with the subscriber line 16. Thus, in accordance with one embodiment of the invention, the energy in the second RF signals carried by the subscriber line 16 (e.g., carried on the center conductor of a coaxial cable 16) is utilized to power the active RF device.

Figure 1A:
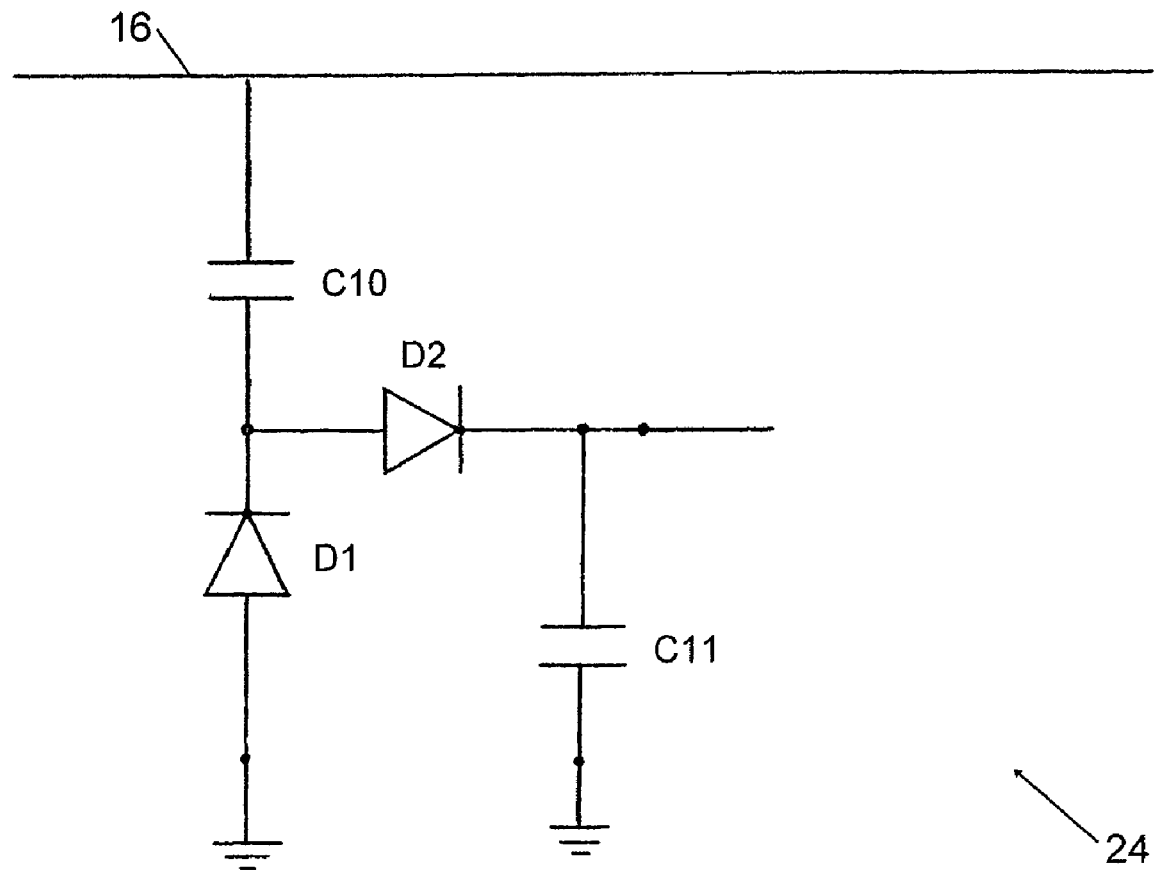
FIG. 1A is a circuit diagram of a rectifier/voltage multiplier suitable for use in the system of FIG. 1, in accordance with one embodiment of the invention.

One exemplary rectifier/voltage multiplier 24 is shown connected to subscriber line 16 in FIG. 1A. Persons of ordinary skill in the art of course will recognize that other rectifier/voltage multiplier circuits could be used instead. The characteristics of the capacitors C10, C11 and diodes D1, D2 in the rectifier/voltage multiplier circuit 24 of FIG. 1A are selected in each case based on the applicable conditions and requirements, such as the frequency of the RF signals to be rectified and voltage multiplied and other factors, as will be understood by those skilled in the art.

The active RF device 28 can comprise any of various types of devices, including but not limited to an active filter for filtering forward and/or return signals, an amplifier for amplifying forward and/or return signals, an active step attenuator for attenuating ingress noise traveling along the return path, etc. In contrast to the present invention, prior cable system architectures in which there is no power source downstream of the tap 18 have been limited to using passive devices along the "drop" between the tap and the subscriber's facility. Accordingly, the possibilities for processing the RF signals being communicated have been limited. The present invention enables active RF devices to be employed and thus substantially broadens the range of possible signal processing that can be performed.

The RF signal generator 22 advantageously can be located adjacent the tap 18 (e.g., at the utility pole that supports the trunk line 14 or a distribution line associated with the trunk line). The rectifier/voltage multiplier 24 is shown outside the subscriber's facility 20, but alternatively it can be inside the subscriber's facility.

Figure 2:
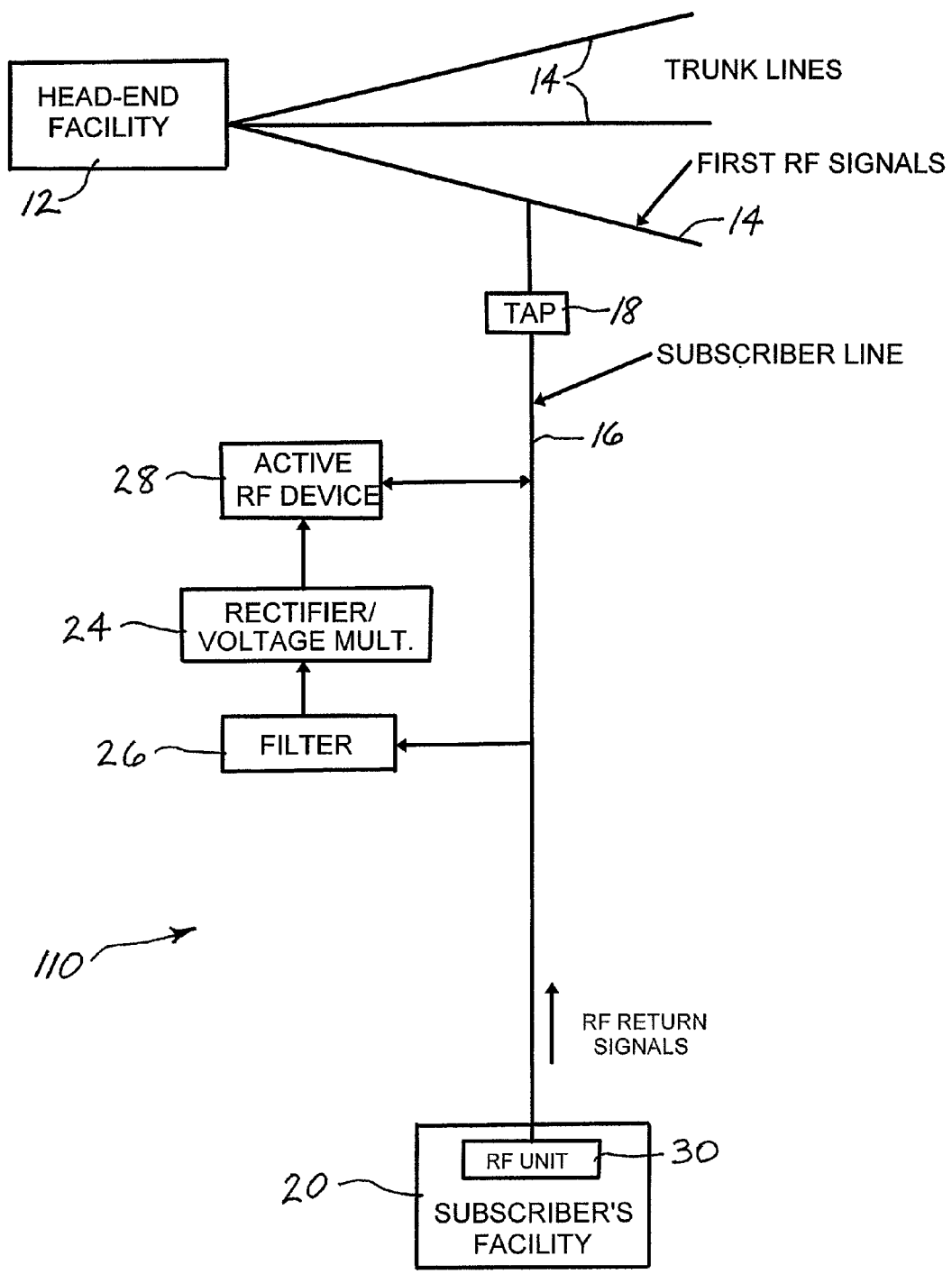
FIG. 2 is a diagrammatic view of a cable system in accordance with a second embodiment of the invention.

A cable system 110 in accordance with a second embodiment of the invention is illustrated in FIG. 2. The system 110 is similar in many respects to the system 10 of FIG. 1, except that no RF signal generator is employed. Instead, the second RF signals that are converted to DC current originate from a unit 30 in the subscriber's facility 20. The unit 30 can be, for example, a CATV converter box or "set-top" box that sends RF return signals along the return path of the subscriber line 16 and trunk line 14 to the head-end facility, or a cable modem that sends RF return signals along the return path.

The system 110 includes a rectifier/voltage multiplier 24 coupled with the subscriber line 16 via a filter 26, as in the prior embodiment. The filtered RF return signals from the unit 30 are rectified and the voltage is multiplied by the rectifier/voltage multiplier 24 to produce DC current that powers an active RF device 28, similar to the prior embodiment. The possible types of active devices 28 and the possible locations for the rectifier/voltage multiplier 24 are the same as in the system 10 described above.

The second RF signals that are converted into DC current for powering the active device 28 alternatively can comprise ingress noise that enters the return path of the subscriber line 16 from various possible sources such as RF equipment operating nearby. Such ingress noise is undesirable and steps typically are taken to attenuate it, such as employing a step attenuator in the return path. However, in accordance with the present invention, the ingress noise can serve a useful purpose in providing RF energy that can be converted by the rectifier/voltage multiplier 24 into DC current for powering the active device (such as an active step attenuator for attenuating the ingress noise).

Figure 3:
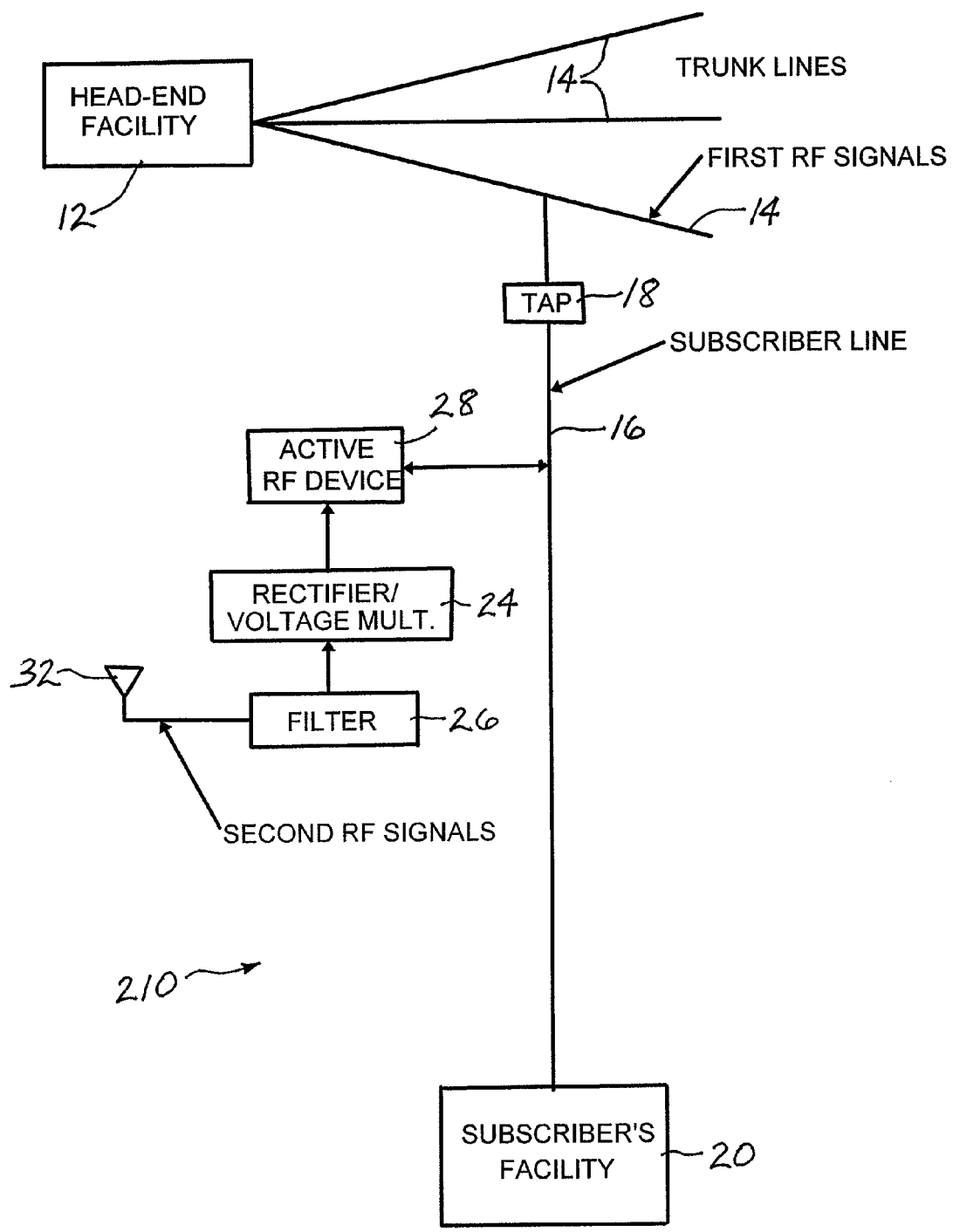
FIG. 3 is a diagrammatic view of a cable system in accordance with a third embodiment of the invention.

A cable system 210 in accordance with a third embodiment of the invention is shown in FIG. 3. The system 210 is similar in many respects to the systems 10 and 110 of FIGS. 1 and 2, except that the second RF signals that are converted to DC current originate from an antenna 32 that receives free-radiated RF signals. The rectifier/voltage multiplier 24 is connected to the antenna 32 via a filter 26, as in the prior embodiments. The filtered RF signals from the antenna 32 are rectified and the voltage is multiplied by the rectifier/voltage multiplier 24 to produce DC current that powers an active RF device 28, similar to the prior embodiments. The possible types of active devices 28 and the possible locations for the rectifier/voltage multiplier 24 are the same as in the systems previously described.

The antenna 32 can receive the RF signals from various possible sources of RF radiation. For example, with the proliferation of wireless Internet networks in homes and businesses, many subscriber locations may be near wireless routers or the like that transmit RF signals either over the IEEE 802.11b or 802.11g WiFi frequency range of about 2.4 to 2.5 GHz, or over the IEEE 802.11a WiFi frequency range of about 5 GHz. The antenna 32 can be designed to receive such WiFi signals and the filter 26 can selectively pass them to the rectifier/voltage multiplier 24. Alternatively, other sources of RF radiation that the antenna 32 can receive include amateur radios, CB radios, cellular telephone equipment, etc.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A cable system for providing RF signals into a subscriber's facility, comprising:
    a main line carrying first RF signals for a plurality of subscribers, the first RF signals containing information communicated between the main line and the subscribers;
    a subscriber line coupled between the main line and the subscriber's facility, the subscriber line carrying the first RF signals and also carrying second RF signals having a frequency different from that of the first RF signals;
    a rectifier/voltage multiplier connected to the subscriber line, the rectifier/voltage multiplier converting AC energy in the second RF signals into DC current;
    a filter connected between the subscriber line and the rectifier/voltage multiplier for processing the RF signals carried along the subscriber line such that substantially only the second RF signals are passed to the rectifier/voltage multiplier; and
    an active RF device powered by the DC current from the rectifier/voltage multiplier, the RF device being located along the subscriber line.

2. The cable system of claim 1, wherein the main line comprises a trunk line carrying AC power and the first RF signals, and further comprising an RF signal generator coupled with the trunk line and powered by the AC power to generate the second RF signals, and a tap connected to the trunk line and to the RF signal generator, the subscriber line being connected to the tap such that the second RF signals are carried over the subscriber line into the subscriber's facility.

3. The cable system of claim 1, wherein the rectifier/voltage multiplier is located outside the subscriber's facility.

4. The cable system of claim 1, wherein the rectifier/voltage multiplier is located inside the subscriber's facility.

5. The cable system of claim 1, wherein the RF device comprises an active filter.

6. The cable system of claim 1, wherein the RF device comprises an amplifier.

7. The cable system of claim 1, wherein the RF device comprises an active step attenuator.

8. The cable system of claim 1, wherein the second RF signals originate inside the subscriber's facility.

9. The cable system of claim 8, wherein the second RF signals comprise return signals transmitted from a unit in the subscriber's facility to the main line.

10. The cable system of claim 9, wherein the second RF signals are generated by a cable modem or converter box located inside the subscriber's facility.

11. The cable system of claim 8, wherein the second RF signals comprise ingress noise picked up by the subscriber line from RF equipment located proximate the subscriber's facility.

12. A cable system for providing RF signals into a subscriber's facility, comprising:
    a main line carrying first RF signals for a plurality of subscribers, the first RF signals containing information communicated between the main line and the subscribers;
    a subscriber line coupled between the main line and the subscriber's facility, the subscriber line carrying the first RF signals;
    an antenna proximate the subscriber's facility for receiving free-radiated second RF signals;
    a rectifier/voltage multiplier connected to the antenna, the rectifier/voltage multiplier converting AC energy in the second RF signals into DC current;
    a filter connected between the antenna and the rectifier/voltage multiplier for selectively passing the second RF signals to the rectifier/voltage multiplier; and
    an active RF device powered by the DC current from the rectifier/voltage multiplier, the RF device being located along the subscriber line.

13. A method for communicating RF signals between a head-end facility and a subscriber's facility, comprising the steps of:
    transmitting first RF signals between the head-end facility and the subscriber's facility via a main line and a subscriber line tapped into the main line, the subscriber line also carrying second RF signals different in frequency from the first RF signals;
    filtering the RF signals carried by the subscriber line such that substantially only the second RF signals are passed to the rectifier/voltage multiplier;
    rectifying the second RF signals using the rectifier/voltage multiplier to produce a DC current; and
    using the DC current to power an active RF device located along the subscriber line.

14. The method of claim 13, further comprising the step of supplying AC power through the main line but not through the subscriber line, and generating the second RF signals using an RF signal generator powered by the AC power from the main line.

15. The method of claim 13, wherein the second RF signals originate in the subscriber's facility.

16. The method of claim 15, wherein the second RF signals comprise return signals sent from a unit in the subscriber's facility via the subscriber line and main line to the head-end facility.

17. The method of claim 15, wherein the second RF signals comprise ingress noise that enters the subscriber line.

18. The method of claim 13, wherein the second RF signals are provided by an antenna located proximate the subscriber's facility, the antenna receiving free-radiated RF signals and supplying them as the second RF signals to the subscriber line.

* * * * *